United States Patent [19]

Klass et al.

[11] 4,424,064

[45] Jan. 3, 1984

[54] METHANE PRODUCTION FROM AND BENEFICIATION OF ANAEROBIC DIGESTION OF AQUATIC PLANT MATERIAL

[75] Inventors: Donald L. Klass, Barrington; Sambhunath Ghosh, Homewood, both of Ill.

[73] Assignee: United Gas Pipe Line Company, Houston, Tex.

[21] Appl. No.: 152,335

[22] Filed: May 22, 1980

[51] Int. Cl.$^3$ .......................... C02F 3/28; C02F 3/32
[52] U.S. Cl. ................... 48/197 A; 210/602; 210/603; 210/613; 435/167; 435/801
[58] Field of Search ............... 210/2, 12, 16, 602, 210/603, 608, 613, 630, 605; 435/167, 801; 48/197 A

[56] References Cited

U.S. PATENT DOCUMENTS

| | | | |
|---|---|---|---|
| 2,198,737 | 4/1940 | Peterson | 435/167 |
| 2,867,945 | 1/1959 | Gotaas | 210/2 |
| 3,421,942 | 1/1969 | McBaine | 435/801 |
| 3,640,846 | 2/1972 | Johnson | 435/167 |
| 3,698,881 | 10/1972 | White | 210/2 |
| 3,981,800 | 9/1976 | Ort | 435/167 |
| 3,981,803 | 9/1976 | Coulthard | 435/801 |
| 3,994,780 | 11/1976 | Klass | 435/167 |
| 4,169,050 | 9/1979 | Serfling | 210/12 |

FOREIGN PATENT DOCUMENTS

| | | | |
|---|---|---|---|
| 2743618 | 3/1979 | Fed. Rep. of Germany | 435/167 |
| 654550 | 3/1979 | U.S.S.R. | 210/2 |

*Primary Examiner*—Ernest G. Therkorn
*Attorney, Agent, or Firm*—Thomas W. Speckman

[57] ABSTRACT

A process for improved methane production by anaerobic digestion of aquatic plant material at least a portion or all of which has been grown in organically polluted water. Mixtures of aquatic plant material one portion of which has been grown in non-polluted and a second portion comprising over about 10 weight percent which has been grown in organically polluted water may be used to result in a synergistic yield of methane. The liquid effluent from the digester may be advantageously returned to the aquatic plant growing pond to maintain the desired organic pollution. The process provides for improved methane production from aquatic plant material which is, by itself, recalcitrant to anaerobic digestion.

18 Claims, No Drawings

METHANE PRODUCTION FROM AND BENEFICIATION OF ANAEROBIC DIGESTION OF AQUATIC PLANT MATERIAL

BACKGROUND OF THE INVENTION

1. Field of the Invention

Methane production by anaerobic digestion has been widely practiced, particularly with respect to digestion of sewage sludge organic waste. In recent times, the world-wide energy shortage has furthered consideration and improvement of such non-fossil sources of energy. This invention relates to a process for improved methane production from and beneficiation of anaerobic digestion comprising anaerobic digestion of aquatic plant material, at least a portion or all of which has been grown in organically polluted water. The process may be carried out under mesophilic or thermophilic temperatures for detention times in excess of about four days. Under steady state anaerobic digestion, a mixed feed blend of aquatic plant material, a portion of which has been grown in non-organically polluted water and a portion of which has been grown in organically polluted water, results in synergistic action providing higher methane yields and production rates than result from the sum of the anaerobic digestion of the individual feed components separately.

2. Description of the Prior Art

The production of methane gas by anaerobic digestion of various organic wastes has been known. There have been continuous efforts to improve methane yield resulting from anaerobic digestion. Most of the prior attempts to increase methane yield have been centered around anaerobic digestion as practiced in municipal waste treatment plants as exemplified by U.S. Pat. Nos. 3,640,846, teaching addition of coal; 3,981,800, teaching pressurized digestion; and 4,022,665, teaching two phase digestion of sewage sludge. Other attempts to improve the production rate and yield of methane by anaerobic digestion have related to improved anaerobic digestion by utilization of liberated enzymes of the biomass for contribution to more efficient digestion as taught by U.S. Pat. No. 3,994,780. The U.S. Pat. No. 3,994,780 teaches the applicability of its process to a wide variety of organic feeds, but does not suggest improved methane production rate and yield by use of aquatic plants grown in organically polluted water nor the synergistically improved methane production by anaerobic digestion of a mixture of aquatic plant material, a portion of which has been grown in non-polluted water and a portion of which has been grown in organically polluted water. The anaerobic digestion of aquatic plant material to produce methane has been recognized as exemplified by R. P. Lecuyer and J. H. Marten, "An Economic Assessment of Fuel Gas from Water Hyacinths", Symposium Papers, Clean Fuels from Biomass, Sewage, Urban Refuse, Agricultural Wastes, Orlando, Fla., Jan. 27-30, 1976. Again, the synergism resulting in improved methane production by anaerobic digestion of a mixture of aquatic plant material, a portion of which has been grown in non-organically polluted water and a portion or all of which has been grown in organically polluted water has not been suggested. Stimulation of methane production in anaerobic waste treatment by metal cations has been recognized as has the problem of toxicity in methane producing anaerobic systems as exemplified by I. J. Kugelman and K. K. Chin, "Toxicity, Synergism and Antagonism in Anaerobic Waste Treatment Processes", Anaerobic Biological Treatment Processes, Advances in Chemistry, Series 105 (1971). The ability of adult hyacinth plants to remove cadmium and nickel from water polluted with these metals has been reported by B. C. Wolverton, Water Hyacinths for Removal of Cadmium and Nickel from Polluted Waters, NASA Technical Memorandum TM-X-72721, February, 1975, National Space Technology Laboratories, Bay St. Louis, Miss. Increased rate of methane production from water hyacinths contaminated with two toxic heavy metals, nickel and cadium, has been reported. B. C. Wolverton, R. C. McDonald and J. Gordon, Bio-Conversion of Water Hyacinths into Methane Gas: Part 1, NASA Technical Memorandum, TM-X-72725, July, 1975, National Space Technology Laboratories, Bay St. Louis, Miss. While recognizing the sensitivity of methane production in anaerobic digestion processes, there is no suggestion of improved methane production by anaerobic digestion of aquatic plant material, at least a portion or all of which has been grown in organically polluted water nor is there any suggestion of the synergism resulting in improved methane production by anaerobic digestion of a mixture of aquatic plant material, a portion of which has been grown in non-organically polluted water and a portion of which has been grown in organically polluted water.

SUMMARY OF THE INVENTION

The process of this invention provides production of methane gas in higher yields and higher rates by thermophilic or mesophilic anaerobic digestion of aquatic plant material, at least a portion or all of which has been grown in organically polluted water. The resulting methane yields and production rates of mixtures of aquatic plant material a portion of which has been grown in non-organically polluted water and a portion of which has been grown in organically polluted water are higher than those obtained by the sum from anaerobic digestion of the individual feed components.

The term "aquatic plant material" as used in this description and the appended claims includes any of the organisms of the kingdom of Plantae which typically have cell walls composed of cellulose in large part and have nutritive systems in which carbohydrates are formed photosynthetically and grow in an aquatic environment. The plant material useful in this invention is fresh harvested or stored plant material, which is usually grown on farms dedicated for this purpose or in natural environments, and is generally untreated chemically or physically, except for size reduction. Exemplary aquatic plants include water hyacinth, duck weed, alligator weed, marsh grass, algae, sea kelp and sargassum. Aquatic plants which are recalcitrant to gas, particularly methane, production under conventional anaerobic digestion conditions may be advantageously grown in organically polluted water or mixed with other aquatic plants grown in organically polluted water for improved methane production by anaerobic digestion. Exemplary of such recalcitrant aquatic plants are water hyacinth, duck weed, alligator weed, marsh grass and marsh plants not grown in organically polluted water.

By the term "organically polluted water" as used in this disclosure and the appended claims, we mean all types of fresh and salt waters having above normal amounts of organic materials including sewage sludge, animal waste, municipal waste, industrial waste, forestry waste, agricultural waste, and the like. The organic materials may be added to a fresh water pond to obtain desired organically polluted water which may be maintained by recycle of the digester effluent to the body of water. As an example, the organically polluted water typically has a Biological Oxygen Demand—five days, $BOD_5$, higher than about 10 mg/l, and contains more than about 0.05 mg/l ammonia nitrogen, more than about 0.05 mg/l phosphorus and dissolved solids in excess of about 300 mg/l. It is desired to avoid water containing materials toxic to the anaerobic cultures. Non-polluted water means water having less than the above Biological Oxygen Demand, or $BOD_5$ less than about 10 mg/l.

It is suitable for the digester feed to comprise more than an inoculum amount of aquatic plant material at least a portion of which has been grown in organically polluted water. Mixtures of individual aquatic plant materials as defined above may be used. It is desired that the aquatic plant feedstock be in an amount of about 0.05 to 3.0 pounds volatile solids loading per cubic foot culture volume per day. When mixed non-polluted and organically polluted water grown aquatic plant materials are used, it is desired that more than about 10 weight percent, and preferably more than about 40 weight percent, on a dry solids basis of aquatic plant material grown in organically polluted water be used, based upon the total weight of plant material grown in both non-polluted and polluted water. Known techniques may be used for simultaneous digestion of the plant material and organic waste. Detention times of in excess of 4 days and preferably about 8 to about 30 days are suitable. Detention times of about 10 to about 16 days are especially preferred. Increases of methane yield of greater than about 25 percent and up to over 80 percent are obtained by anaerobic digestion of aquatic plant material grown in organically polluted water according to this invention. Methane production by anaerobic digestion according to the process of this invention using anaerobic digestion of aquatic plant material at least a portion of which has been grown in organically polluted water can be continued for long periods of time without addition of external nutrients. Methane production is stable over long periods of digestion. Aquatic plant materials, for example water hyacinth and duck weed not grown in polluted water, which are recalcitrant to anaerobic digestion alone are readily digested using the process of this invention involving aquatic plant material at least a portion of which has been grown in organically polluted water. All or a portion of the liquid effluent from the anaerobic digester may be advantageously added or returned to the body of water for aquatic plant growth to obtain and/or maintain the desired level of organic contents for organically polluted water without further addition of other organic materials to the body of water.

It is an object of this invention to provide a process for methane production resulting in higher yields and higher production rates than previously obtained by the anaerobic digestion of aquatic plant materials.

It is another object of this invention to provide a process for methane production by anaerobic digestion of aquatic plant material which does not require addition of external nutrient throughout the process.

It is yet another object of this invention to provide a process for methane production by anaerobic digestion resulting in digester effluent which can be advantageously returned to the aquatic plant growing pond.

It is another object of this invention to provide a process for methane production from aquatic plant material which is, by itself, a recalcitrant to anaerobic digestion.

It is another object of this invention to provide a process suitable for production of synthetic natural gas (SNG) by an anaerobic digestion process comprising anaerobic digestion of a mixture of aquatic plant material grown in both non-polluted and organically polluted water resulting in synergistic methane production.

These and other objects and advantages are achieved by the process of this invention as set forth in the more detailed description of preferred embodiments.

DESCRIPTION OF THE PREFERRED EMBODIMENTS

The anaerobic digestion of aquatic plant material according to this invention comprising anaerobic digestion of aquatic plant material at least a portion of which has been grown in organically polluted water and removal of methane containing gas from the digestion zone may be carried out under conditions of temperature, both mesophilic (about 20° to 45° C.) and thermophilic (about 45° to 70° C.); detention times in excess of about 4 days and usually about 8 to 30 days, preferably about 10 to 16 days; and loading rates, pretreatment of feed, digester mixing and recycling as known to the art for anaerobic digestion and pointed out more particularly in the references identified above. The present invention may be readily applied to multistage digestion, such as exemplified by our earlier U.S. Pat. No. 4,022,665.

An important aspect of the present invention is the anaerobic digestion of aquatic plant material at least a portion, more than about 10 weight percent on a dry solids basis, or all of which has been grown in organically polluted water. The aquatic plant material may be premixed prior to introduction into the digester or the individual feed materials may be separately introduced into the digester and mixed within the digester. Feeding and associated wasting may be continuous or intermittent.

Any active methane producing mesophilic or thermophilic anaerobic digestion system may be used. Methane-producing anaerobic systems utilizing acid forming bacteria and methane-producing organisms as well known to be employed to produce methane from sewage sludge can be employed in practice of the present invention. A review of the microbiology of anaerobic digestion is set forth in Anaerobic Digestion, 1. The Microbiology of Anaerobic Digestion, D. F. Toerien and W. H. J. Hattingh, Water Research, Vol. 3, pages 385–416, Pergamon Press (1969). As set forth in that review, the principal suitable non-methanogenic bacteria include species from genera including Aerobacter, Aeromonas, Alcaligenes, Bacillus, Bacteroides, Clostridium, Escherichia, Klebsiella, Leptospira, Micrococcus, Neisseria, Paracolobactrum, Proteus, Pseudomonas, Rhodopseudomonas, Sarcina, Serratia, Streptococcus and Streptomyces. Exemplary methane-producing organisms suitable for use in the present invention include members of Methanobacterium, Methanococcus and Methanosarcina, specific members being *Methanobacterium formicicum, Methanosarcina barkerii, Methanobacterium omelianskii, Methanococcus vannielii, Methanobacterium sohngenii, Methanosarcina methanica, Methanococcus mazei, Methanobacterium suboxydans* and *Methanobacterium propionicum.* It is usually preferred to use mixed cultures to obtain the most complete fermentation action. Nutritional balance and pH adjustments may be made to the digester system as is known to the art to optimize methane production from the culture used.

Utilization of aquatic plant material grown in organically polluted water or a mixture of aquatic plant material a portion grown in organically polluted water and a portion grown in non-polluted water as a feed for the improved methane producing process of this invention overcomes prior problems of aquatic plant materials recalcitrant to methane production by themselves and allows use of wider varieties of aquatic plants. Further, storage of plant material feed stocks which has not been satisfactory and is expensive may be reduced. The use of a mixture of plant materials according to this invention helps to accommodate the seasonal variability of various species and geographic locations of farms for their production. The methane containing gas produced may be treated by methods known to the art to provide substitute natural gas (SNG).

The process of this invention provides a synergistic yield of methane comprising the steps of digesting in an active mesophilic or thermophilic anaerobic digestion system a mixture of aquatic plant material grown in non-polluted and organically polluted waters and withdrawing methane-containing gas from the digestion system. By methane-containing gas we mean the mixture of principally methane and carbon dioxide as produced by anaerobic digestion systems. Various means for increasing methane yield, gas quality and digestion kinetics involving feed pretreatment, residue post-treatment and recycling or advanced digestion modes may be used in conjunction with the process of this invention.

The following specific examples are set forth for the purpose of illustration and should not limit this invention in any way.

EXAMPLE I

Two digesters were operated under the same conditions, the first being fed water hyacinth (Eichhernia crassipes) grown in non-organically polluted hard water having $BOD_5$ of 5 mg/l and hardness of 20 grains/gal. and the second being fed water hyancinth grown in sewage polluted water having $BOD_5$ to 20 mg/l.

Digester start up was achieved with a mixed inoculum, 70 volume percent derived from an existing mesophilic anaerobic digester fed with sea kelp (Macrocystis pyrifera) and operated at a loading of 0.1 lb. VS/ft$^3$-day for detention time of 18 days and 30 volume percent derived from another existing mesophilic anaerobic digester fed with mixed primary-activated sewage sludge operated at a loading of 0.8 lb. VS/ft$^3$-day for detention time of 5.6 days. The mixed inoculum contained a diversity of acid forming and methane producing microorganisms is set forth in the Toerien and Hattingh article. (Ibid) The digesters were operated with 70 weight percent sea kelp and 30 weight percent sludge on a VS basis with daily feeding and wasting to increase culture volumes by 10% per day to the desired culture volume of about twice the initial inoculum volume. Loading was maintained at 0.1 lb. VS/ft$^3$-day and detention time of 15 days. Each digester then was passed through a feed transition period during which it was fed decreasing amounts of kelp-sludge mixture and increasing amounts of the respective water hyacinth feed material.

Each digester was operated in a semi-continuous completely mixed anaerobic digester manner with a culture volume of 5 liters for a detention time of 12 days, a loading of 0.1 lb. VS/ft$^3$-day, and a temperature of 35° C. at a pH of 6.8–7.1. The runs were continued for several detention times and exhibited stable performance. At steady state, the results of each digester were as follows:

| | Plants Grown in Non-Polluted Water Digester | Plants Grown in Organically Polluted Water Digester |
|---|---|---|
| Gas Production Rate Vol/day-vol. culture | 0.268 | 0.488 |
| Gas Yield SCF/lb VS added | 2.69 | 4.88 |
| Methane Yield SCF/lb VS added | 1.66 | 2.80 |
| Methane Concentration Mole-percent | 61.8 | 57.4 |
| % VS Reduction | 17.0 | 29.2 |
| Energy Recovery in Gas % of Energy in Feed | 21.1 | 32.0 |

It is seen that methane yield increased about 69 percent and the gas production rate increased about 82 percent using water hyacinth feed which had been grown in sewage polluted water. The digester effluent had very low concentration of soluble organics and could be dewatered directly by vacuum filtration providing cake-solids content and cake yield comparable to that of filtered, digested sewage sludge.

EXAMPLE II

Two anaerobic digesters are operated with the same feeds as described in Example I and under the same conditions as Example I except the temperature was maintained at 55° C. The gas production parameters with organically polluted water grown water hyancinth are about 20–30% improved over the non-polluted water grown water hyacinth feed material.

EXAMPLE III

Two anaerobic digesters are operated under the same conditions as Example I, the daily feed volume of one being water hyacinth feed grown in non-polluted water and the other a mixture of 60 weight percent water hyacinth grown in non-polluted water and 40 weight percent water hyacinth grown in sewage polluted water on a dry solids basis in Example I. The gas production rate and methane yield from the digester with the mixture of water hyacinth grown in sewage polluted and non-polluted water are about 40% improved over the non-polluted water grown feed material, showing the synergistic effect since only about 30% improvement would be expected based upon the data of Example I.

EXAMPLE IV

Two anaerobic digesters were operated as described and under the same conditions set forth in Example I except duck weeds grown in non-polluted and sewage polluted water were used as digester feeds. The results were:

| | Plants Grown in Non-Polluted Water Digester | Plants Grown in Organically Polluted Water Digester |
| --- | --- | --- |
| Gas Production Rate Vol/day-vol. culture | .34 | .48 |
| Gas Yield SCF/lb VS added | 3.37 | 4.81 |
| Methane Yield SCF/lb VS added | 2.2 | 3.1 |
| Methane Concentration Mole-percent | 60 | 64 |
| % VS Reduction | 20 | 29 |
| Energy Recovery in Gas % of Energy in Feed | 24 | 35 |

The liquid effluent from the digester using plants grown in organically polluted water was recycled to the growth pond for maintenance of the organic composition. It is seen that the methane yield and the gas production rate increased about 41%.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for improved methane production by anaerobic digestion comprising anaerobic digestion for more than about four days detention time of aquatic plant material, at least a portion of which has been grown in organically polluted water, and removal of methane containing gas from the digestion zone, said aquatic plant portion which has been grown in organically polluted water comprising over about 10 weight percent on a dry solids basis of the total aquatic plant material.

2. The process of claim 1 wherein said aquatic plant portion which has been grown in organically polluted water comprises over about 40 weight percent on a dry solids basis of the total aquatic plant material.

3. The process of claim 2 wherein said organically polluted water has a $BOD_5$ higher than about 10 mg/liter.

4. The process of claim 1 wherein said aquatic plant portion which has been grown in organically polluted water comprises the total aquatic plant material.

5. The process of claim 1 wherein up to about 90 weight percent, on a dry solids basis of the total aquatic plant material, has been grown in non-organically polluted water.

6. The process of claim 1 wherein anaerobic digestion is carried out under mesophilic temperatures of about 20° to about 45° C. for detention times of about 8 to about 30 days.

7. The process of claim 1 wherein anaerobic digestion is carried out under thermophilic temperatures of about 45° to about 70° C. for detention times of about 8 to about 30 days.

8. The process of claim 1 wherein said aquatic plant material is selected from the group consisting of water hyacinth, duck weed, alligator weed, marsh grass, algae, sea kelp and sargassum.

9. The process of claim 1 wherein at least a portion of the liquid effluent from said digestion zone is added or returned to the body of water for aquatic plant growth to maintain organic contents for organically polluted water.

10. The process of claim 9 wherein all of the liquid effluent from said digestion zone is added or returned to the body of water for aquatic plant growth to maintain organic contents for organically polluted water.

11. The process of claim 1 wherein said organically polluted water has a $BOD_5$ higher than about 10 mg/liter.

12. In a process of methane production by anaerobic digestion of aquatic plant material, the improvement of obtaining a synergistic yield of methane comprising the steps of:

digesting for more than about four days detention time in an active mesophilic or thermophilic anaerobic digestion system aquatic plant material one portion of which has been grown in non-polluted water and a second portion, comprising over about 10 weight percent, on a dry solids basis of the total aquatic plant material, which has been grown in organically polluted water; and withdrawing methane-containing gas from said digestion system.

13. The process of claim 12 wherein said organically polluted water has a $BOD_5$ higher than about 10 mg/liter.

14. The process of claim 13 wherein said non-polluted water has a $BOD_5$ less than about 10 mg/liter.

15. In the process of claim 12 wherein said second portion comprises over about 40 weight percent on a dry solids basis of the total aquatic plant material.

16. The process of claim 15 wherein said organically polluted water has a $BOD_5$ higher than about 10 mg/liter.

17. In the process of claim 12 wherein at least a portion of the liquid effluent from said digestion system is added or returned to the body of water for aquatic plant growth to maintain organic contents for organically polluted water.

18. In the process of claim 12 wherein all of the liquid effluent from said digestion system is added or returned to the body of water for aquatic plant growth to maintain organic contents for organically polluted water.

* * * * *